(12) United States Patent
Zhang (10) Patent No.: US 8,468,706 B2
(45) Date of Patent: Jun. 25, 2013

(54) TEST DEVICE FOR TESTING DISTANCE BETWEEN CENTERS OF TWO THROUGH HOLES

(75) Inventor: Bing-Jun Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 188 days.

(21) Appl. No.: 13/207,456

(22) Filed: Aug. 11, 2011

(65) Prior Publication Data

US 2012/0266477 A1 Oct. 25, 2012

(30) Foreign Application Priority Data

Apr. 21, 2011 (CN) .......................... 2011 1 0100886

(51) Int. Cl.
*G01B 5/14* (2006.01)
(52) U.S. Cl.
USPC ............. 33/520; 33/1 BB; 33/811; 33/501.06
(58) Field of Classification Search
USPC .............................. 33/520, 1 BB, 811, 501.06
See application file for complete search history.

(56) References Cited

U.S. PATENT DOCUMENTS

| | | | | | |
|---|---|---|---|---|---|
| 2,693,033 | A | * | 11/1954 | Acker, Jr. et al. | 33/520 |
| 3,289,307 | A | * | 12/1966 | Kelly | 33/520 |
| 4,327,493 | A | * | 5/1982 | Dickerson | 33/520 |
| 4,477,978 | A | * | 10/1984 | Azuma | 33/600 |
| 4,731,931 | A | * | 3/1988 | Goodman et al. | 33/796 |
| 5,412,878 | A | * | 5/1995 | Edman | 33/810 |
| 5,509,208 | A | * | 4/1996 | Oja | 33/203 |
| 6,141,885 | A | * | 11/2000 | Ishitani et al. | 33/645 |
| 6,378,192 | B1 | * | 4/2002 | Ohmi et al. | 29/464 |
| 7,827,702 | B1 | * | 11/2010 | Zhang | 33/613 |
| 7,963,045 | B2 | * | 6/2011 | Zhang | 33/501.06 |
| 8,225,522 | B2 | * | 7/2012 | Prior et al. | 33/811 |
| 2004/0049936 | A1 | * | 3/2004 | Newman | 33/613 |

* cited by examiner

*Primary Examiner* — Christopher Fulton
(74) *Attorney, Agent, or Firm* — Altis Law Group, Inc.

(57) ABSTRACT

A test device for testing whether the distance between centers meets specifications includes a support member, a benchmark member set on a first end of the support member, to be positioned at the first through hole, a test member set on a second end of the support member, to be positioned at the second through hole, and a sliding member defining a receiving slot. The test member is also slidable in a direction perpendicular to the slidable direction of the test member. If the test member can enter the receiving slot, the first article is qualified, if test member cannot enter the receiving slot, the second article does not meet the required standard.

10 Claims, 7 Drawing Sheets

TEST DEVICE FOR TESTING DISTANCE BETWEEN CENTERS OF TWO THROUGH HOLES

BACKGROUND

1. Technical Field

The present disclosure relates to test devices, and particularly, to a device for testing the distance between centers of two through holes.

2. Description of Related Art

In machining, a lot of through holes are created in workpieces. To ensure that the distance between two adjacent through holes meets a specification, a caliper is generally used for testing the distance. However, due to the complicated operation of the caliper and human error, the reliability of the test is reduced.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
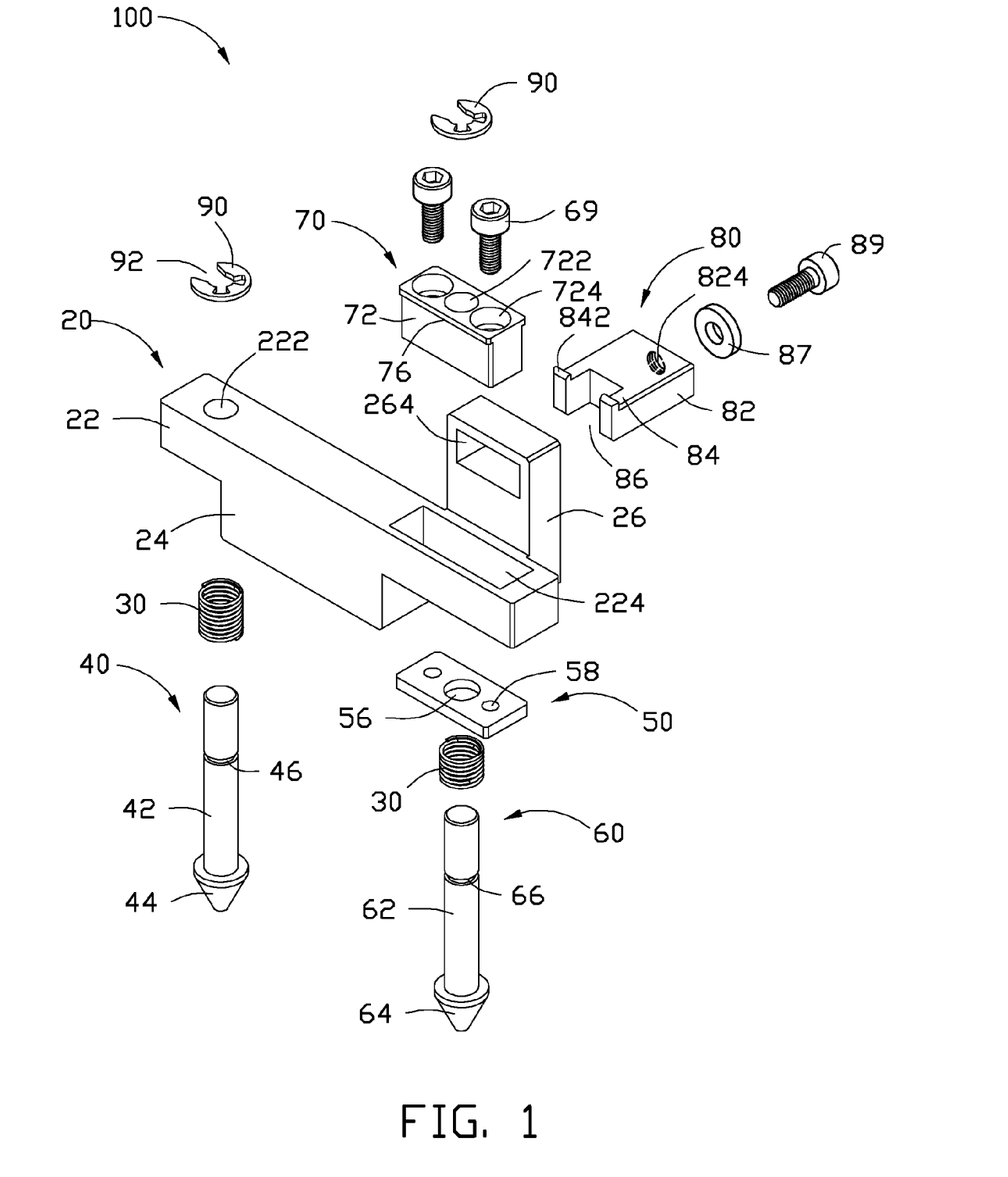
FIG. 1 is an exploded, isometric view of an exemplary embodiment of a test device.
Figure 2:
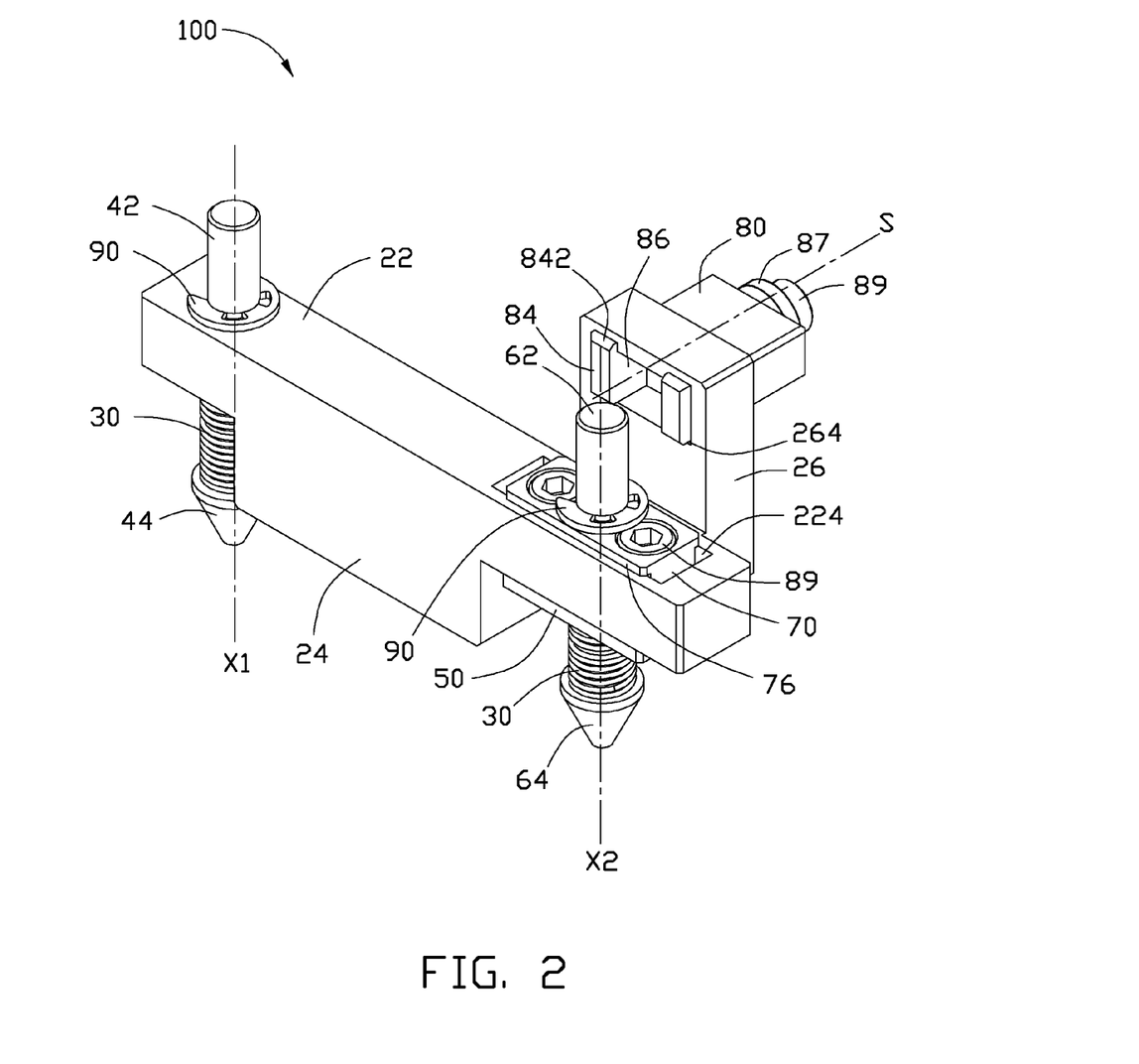
FIG. 2 is an assembled, isometric view of the test device of FIG. 1.
Figure 3:
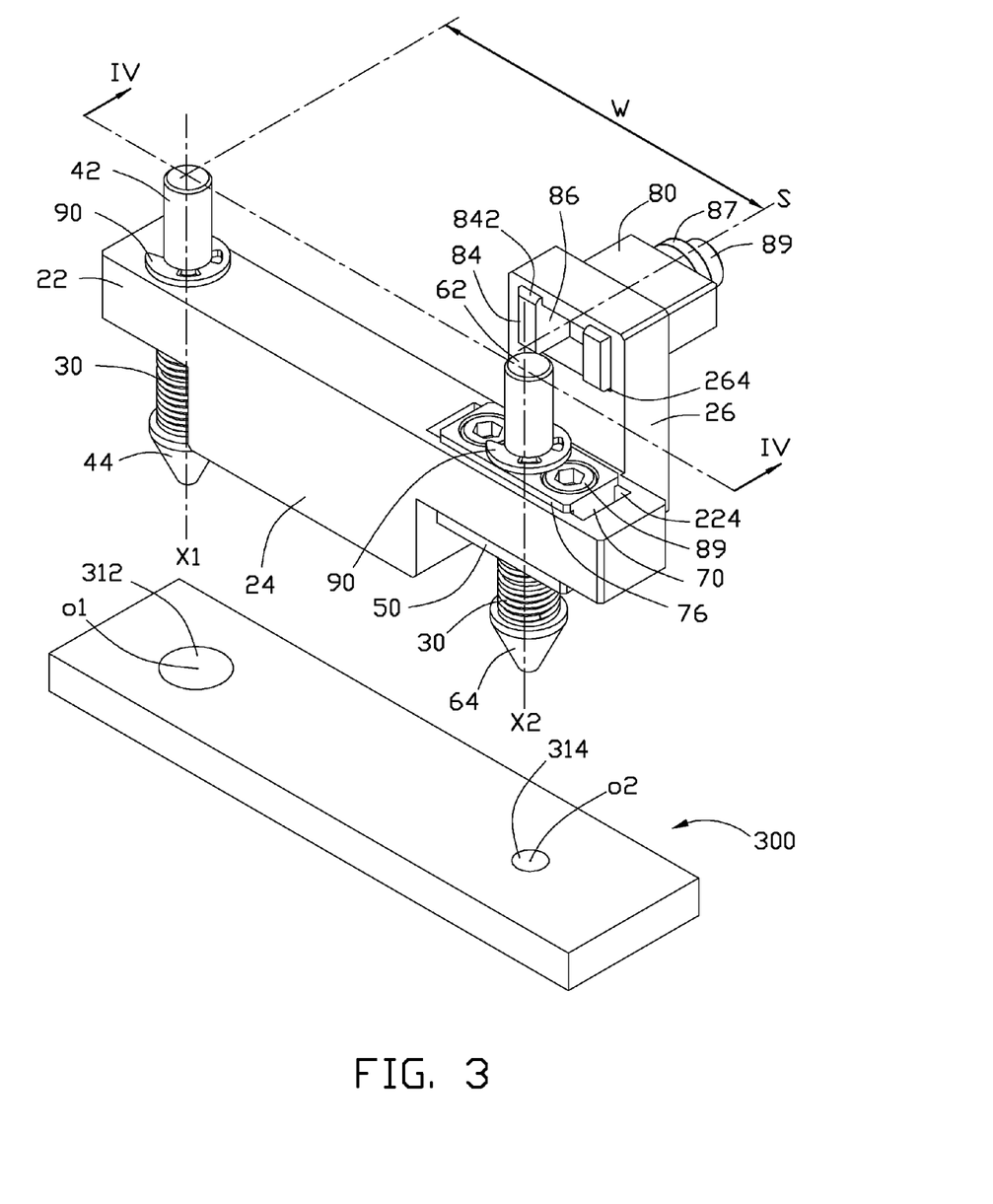
FIG. 3 is an exploded, isometric view of the test device of FIG. 2 and a test article.
Figure 4:
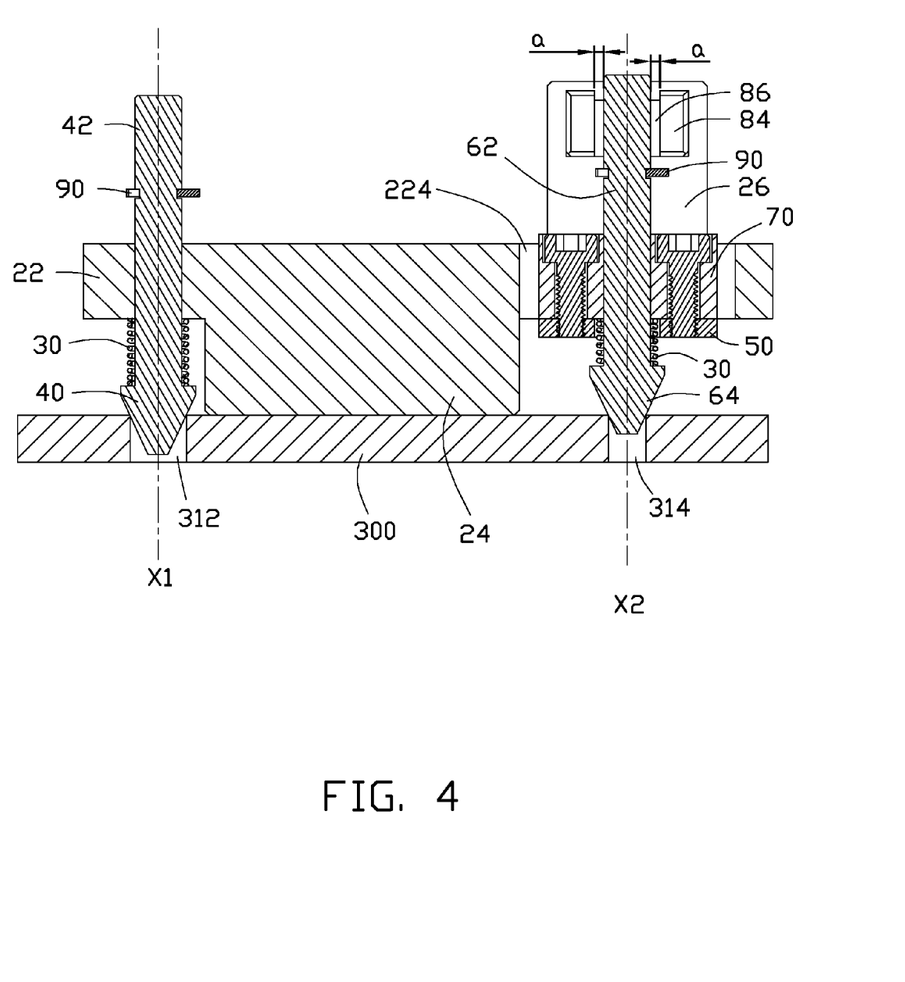
FIG. 4 is a sectional view of FIG. 3, taken along the line of IV-IV, showing the test device in use.
Figure 5:
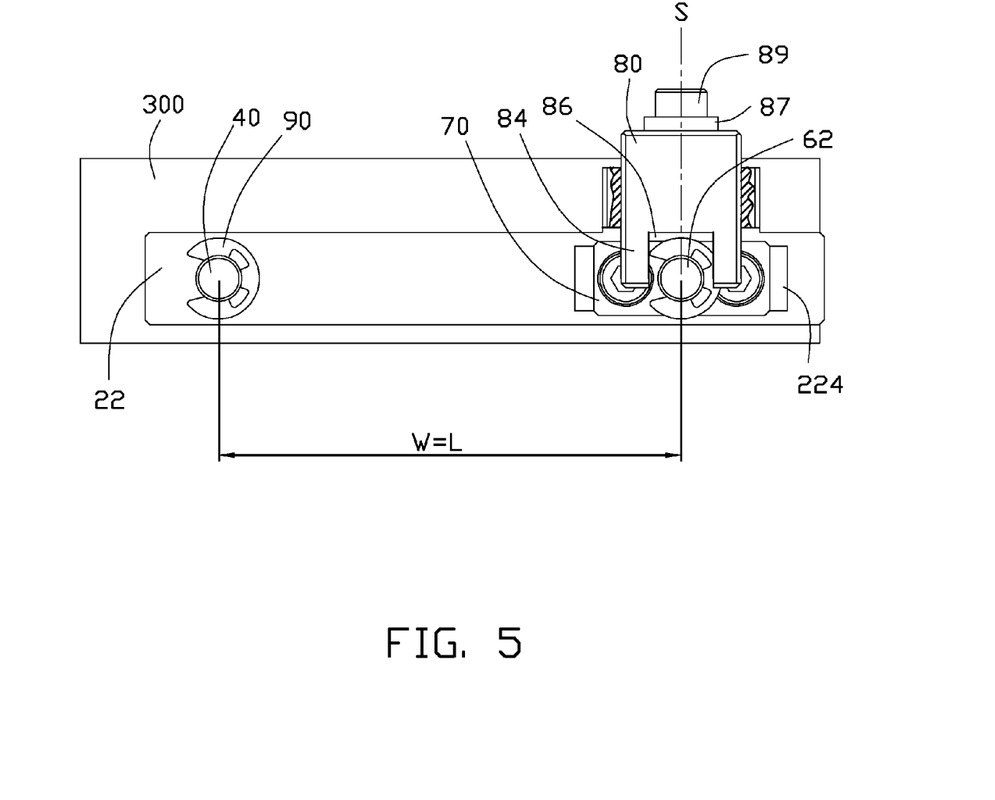
FIGS. 5-7 are plan views of FIG. 3, but showing three different states.
Figure 6:
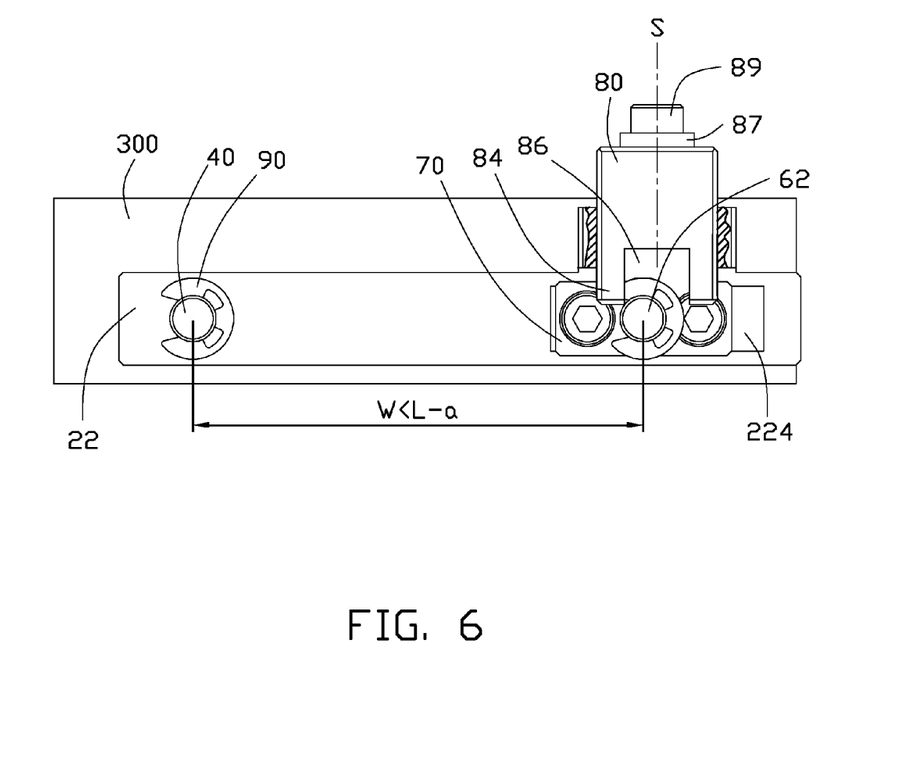
Figure 7:
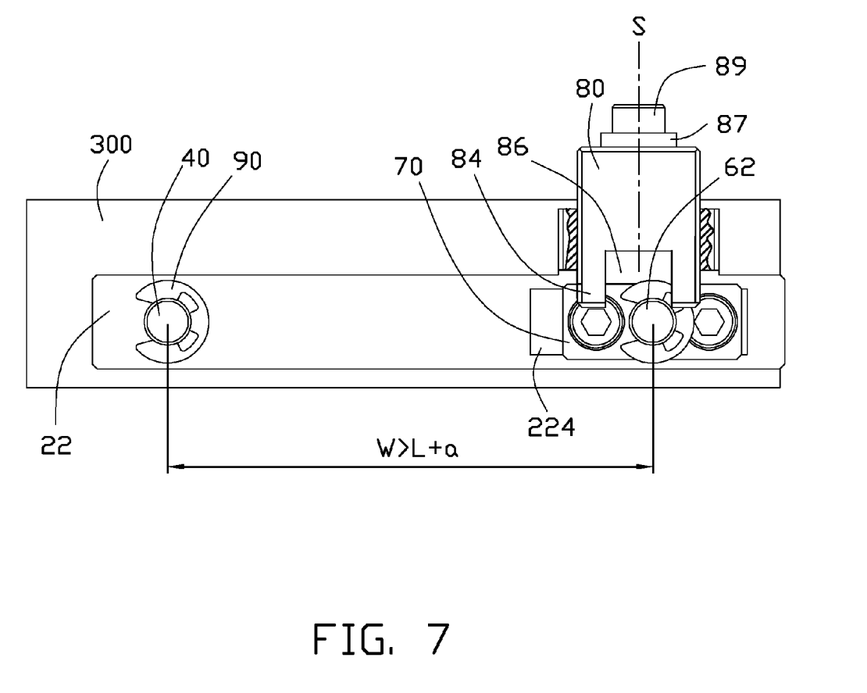

Referring to FIGS. 1-3, an exemplary embodiment of a test device 100 tests whether the distance "W" between the center O1 of a first through hole 312 and the center O2 of a second through hole 314 defined in an article 300 meets specifications. The specification distance between the center O1 and the center O2 is "L", a permissible error is "a". The center O1 of the first through hole 312 and the center O2 of the second through hole 314 must meet a determined specification that the distance between the centers O1 and O2 is within the range of "W=L±a". The test device 100 includes a supporting member 20, two elastic members 30, a benchmark member 40, a connecting plate 50, a test member 60, a first sliding member 70, a second sliding member 80, and two circlips (clips 90). In this embodiment, the article 300 may be a part of a computer.

The supporting member 20 includes a substantially rectangular support plate 22, a positioning block 24 perpendicularly extending down from the bottom surface of the support plate 22, and an extension block 26 extending up from a first end of the support plate 22 and at a side of the support plate 22. A guide hole 222 is defined in the other end of the support plate 22, away from the extension block 26. An elongate first guide slot 224 is defined in the first end of, and adjacent to the extension block 26. The first guide slot 224 is parallel to an elongated direction of the support plate 22. The positioning block 24 is substantially rectangular, and is located between the guide hole 222 and the first guide slot 224. The bottom surface of the positioning block 24 is parallel to the top surface of the support plate 22. A rectangular second guide slot 264 is defined in the distal end of the extension block 26, opposite to the first guide slot 224. The extending direction of the second guide slot 264 is parallel to that of the first guide slot 224.

The benchmark member 40 includes a cylindrical main body 42, and a tapered positioning portion 44 extending from a first end of the main body 42. An annular groove 46 is defined in a circumference of the main body 42, adjacent to the other end of the main body 42. The diameter of the main body 42 is substantially equal to the diameter of the guide hole 222. The diameter of the larger end of the positioning portion 44 adjacent to the main body 42 is greater than the diameter of the guide hole 222.

The connecting plate 50 is substantially rectangular. A through hole 56 is defined in the middle of the connecting plate 50. Two screw holes 58 are defined in the connecting plate 50, flanking the through hole 56.

The test member 60 is similar to the benchmark member 40, and includes a cylindrical main body 62, and a tapered test head 64 extending from a first end of the main body 62. An annular groove 66 is defined in the circumference of the main body 62, adjacent to the other end of the main body 62. The diameter of the main body 62 is substantially equal to the diameter of the through hole 56 of the connecting plate 50. The diameter of the larger end of the test member 64 is greater than the diameter of the through hole 56.

The first sliding member 70 includes a rectangular sliding block 72, and two flanges 76 extending out from opposite sides of the top of the sliding block 72. A guide hole 722 is defined in the middle of the top of the sliding block 72. Two stepped holes 724 are defined in the sliding block 72, flanking the guide hole 722.

The second sliding member 80 includes a substantially rectangular sliding portion 82, a circular washer 87, and a screw 89. Two substantially rectangular protrusions 84 extend forward from the front side of the sliding portion 82, each topped with a latch or claw (projection 842). The sliding portion 82 and the protrusions 84 cooperatively form a receiving slot 86. The width of the receiving slot 86 is equal to the diameter of the main body 62 plus twice the permissible error "a". A screw hole 824 is defined in the rear surface of the sliding portion 82, opposite to the receiving slot 86. The external diameter of the washer 87 is greater than the width of the second guide slot 264.

Each clip 90 is a circlip, to fit in the grooves 46 or 66 of the main bodies 42 and 62.

In this embodiment, the elastic members 30 are coil springs.

Referring to FIG. 2, in assembly, one elastic member 30 fits about the main body 42 of the benchmark member 40. A first end of the elastic member 30 resists against the positioning portion 44. The main body 42 extends through the guide hole 222 from the bottom surface of the support member 20, with the second end of the main body 42 extending from the top surface of the support plate 22. One of the clips 90 is engaged in the groove 46 through the opening 92, and resists against the top surface of the support plate 22. A second end of the elastic member 30 resists against the bottom surface of the support plate 22. The benchmark member 40 is slidably engaged in the guide hole 222.

The sliding block 72 is inserted into the first guide slot 224 from the top surface of the support member 20. The flanges 76 are supported on the top surface of the support plate 22. Two screws 69 extend through the corresponding stepped holes 724, to engage with the connecting plate 50. The connecting plate 50 is fixed to the bottom surface of the first sliding member 70. The two opposite sides of the connecting plate 50 are slidably engaged with the bottom surface of the support plate 22.

In a similar fashion, the other elastic member 30 fits about the main body 62 of the test member 60. A first end of the elastic member 30 resists against the test head 64. The main body 62 of the test member 60 extends through the through hole 56 of the connecting plate 50 and the guide hole 722 of the first sliding member 70, from the bottom surface of the support member 20. The second end of the main body 62 extends from the top surface of the first sliding member 70. A clip 90 is engaged in the groove 66 of the test member 60 through the opening 92, and resists against the top surface of the first sliding member 70. The other end of the elastic member 30 resists against the bottom surface of the connecting plate 50. The test member 60 is slidably engaged in the guide hole 722.

The sliding portion 82 of the second sliding member 80 is inserted into the second guide slot 264 from the front side of the extension block 26. The projections 842 are blocked by the front surface of the extension block 26, to prevent the disengagement of the second sliding member 80 from the extension block 26. The screw 89 extends through the washer 87, to screw into the screw hole 824 of the sliding portion 82.

The first sliding member 70, the connecting plate 50, and the test member 60 can move together along the first guide slot 224, relative to the benchmark member 40. The second sliding member 80 can move in the second guide slot 264, between the washer 87 and the projections 842. The positioning portion 44 and the test head 64 are lower than the bottom surface of the positioning block 24.

Referring to FIG. 3, the distance between the axis "X1" of the benchmark member 40 and the central line "S" of the second sliding member 80 is equal to the specification distance "L". The distance between each of the opposite ends of the receiving slot 86 and the central line "S" is equal to the radius of the main body 62 plus the permissible error "a". Therefore, the distance "W" between the first through hole 312 and the second through hole 314 is L−a≦W≦L+a.

Referring to FIGS. 4 to 7, in use, the article 300 is placed under the test device 100. The axis X1 of the benchmark member 40 is aligned with the first through hole 312. The test member 60 is moved along the first guide slot 224 to seek the alignment of the axis X2 with the second through hole 314. The positioning portion 44 of the benchmark member 40 is inserted into the first through hole 312, and the test head 64 of the test member 60 is inserted into the second through hole 314. The positioning block 24 is supported on the article 300, deforming the elastic members 30. Pushing the screw 89, the second sliding member 80 is moved forward. If the main body 62 of the test member 60 is fully received in the receiving slot 86, it means that L−a≦W≦L+a, and the article 300 passes this test (shown in FIG. 4 or FIG. 5). If the main body 62 of the test member 60 is not received in the receiving slot 86, it means that W<L−a or W>L+a, and the article 300 fails the test (shown in FIG. 6 and FIG. 7).

Even though numerous characteristics and advantages of the embodiments have been set forth in the foregoing description, together with details of the structure and function of the embodiments, the present disclosure is illustrative only, and changes may be made in details, especially in the matters of shape, size, and arrangement of parts within the principles of the embodiments to the full extent indicated by the broad general meaning of the terms in which the appended claims are expressed.

What is claimed is:

1. A test device for testing whether a distance between centers of a first and a second through holes defined in an article meets a specification, the test device comprising:
   a support member;
   a benchmark member set on a first end of the support member to be positioned at the first through hole with a center line of the benchmark member aligning with a center of the first through hole;
   a test member set on a second end of the support member opposite to the first end, wherein a position of the test member on the second end of the support member is adjustable in a first direction relative to the support member to make the test member position at the second through hole with a center line of the test member aligning with a center of the second through hole; and
   a first sliding member slidably mounted to the second end of the support member and slidable in a second direction perpendicular to the first direction, the first sliding member defining a receiving slot facing the test member, wherein a first distance between a central line of the benchmark member and a central line of the receiving slot is equal to a specification distance between centers of the first and second through holes, a second distance between each of opposite ends of the receiving slot and the central line of the receiving slot is equal to a half of a width of the test member plus a permissible error;
   wherein if the first sliding member can move to receive the test member entering the receiving slot at the position of the test member where the width is measured, the first article is qualified; and wherein if the test member cannot enter the receiving slot in such manner, the second article is unqualified.

2. The test device of claim 1, wherein the test member comprises a cylindrical main body, a test head extending from a first end of the main body, the test head is operable to be inserted into the second through hole, the width of the test member equals to a diameter of the main body.

3. The test device of claim 1, wherein the support member comprise a support plate, a positioning block extending down from the support plate, and an extension block extending up from the support plate, a first guide hole is defined in a first end of the support plate and extends through the top and the bottom of the support plate, an Elongate first guide slot is defined in a second end of the support plate opposite to the first end, the extension block extends from the second end, the benchmark member comprises a first main body slidably extending through the first guide hole from bottom to top, the test member comprises a second main body slidably mounted in the first guide slot, a rectangular second guide slot is defined in the extension block, the extending direction of the second guide slot is parallel to that of the first guide slot, the first sliding member is slidably mounted in the second guide slot.

4. The test device of claim 3, wherein a tapered positioning portion extends from a first end of the first main body to enter the first through hole, a tapered test head extends from a first end of the second main body to enter the second through hole.

5. The test device of claim 4, wherein the first main body is fitted about an elastic member, a first end of the elastic member resists against the positioning portion, and a second end of the elastic member resists against the bottom of the support plate, a clip is fixed to a second end of the first main body opposite to the positioning portion and resists against the top of the support plate.

6. The test device of claim 4, wherein the second main body is fitted about an elastic member, a first end of the elastic member resists against the test head, and a second end of the elastic member resists against the bottom of the support plate, a clip is fixed to a second end of the second main body opposite to the test head and resists against the top of the support plate.

7. The test device of claim 3, further comprising a second sliding member slidably mounted in the first guide slot, wherein a second guide hole is defined in the second sliding member and extends through the top and the bottom of the second sliding member, the second main body slidably extends through the second guide hole from top to bottom.

8. The test device of claim 7, wherein two flanges extend out from opposite sides of the top of the sliding member; the flanges are supported on the top of the support plate.

9. The test device of claim 3, wherein the first sliding member comprises a sliding portion slidably received in the second guide slot of the support member in the second direction, two protrusions respectively extend forward from opposite ends of a front surface of the sliding portion, the sliding block, and the protrusions cooperatively bound the receiving slot.

10. The test device of claim 9, wherein a projection protrudes up from a distal end of each protrusion, the projection is operable to be blocked by the front surface of the extension block, to prevent the second sliding member from disengaging from the support member.

* * * * *